US009310862B2

(12) United States Patent
Cabler et al.

(10) Patent No.: US 9,310,862 B2
(45) Date of Patent: Apr. 12, 2016

(54) METHOD AND APPARATUS FOR MONITORING PERFORMANCE FOR SECURE CHIP OPERATION

(71) Applicant: Advanced Micro Device, Inc., Sunnyvale, CA (US)

(72) Inventors: Carlin Dru Cabler, Austin, TX (US); Sebastien Nussbaum, Lexington, MA (US); Leonard Disanza, Austin, TX (US); Michael A. Nix, Austin, TX (US); Stephen Kosonocky, Sunnyvale, CA (US); Thomas Hirsch, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 24 days.

(21) Appl. No.: 14/282,451

(22) Filed: May 20, 2014

(65) Prior Publication Data
US 2015/0052622 A1 Feb. 19, 2015

Related U.S. Application Data

(60) Provisional application No. 61/825,470, filed on May 20, 2013.

(51) Int. Cl.
| | | |
|---|---|---|
| *G06F 21/00* | (2013.01) | |
| *G06F 1/24* | (2006.01) | |
| *G06F 21/70* | (2013.01) | |
| *G06F 21/71* | (2013.01) | |
| *G06F 21/57* | (2013.01) | |
| *G06F 21/55* | (2013.01) | |
| *G09C 1/00* | (2006.01) | |
| *H04L 9/00* | (2006.01) | |

(52) U.S. Cl.
CPC ............... *G06F 1/24* (2013.01); *G06F 21/558* (2013.01); *G06F 21/57* (2013.01); *G06F 21/70* (2013.01); *G06F 21/71* (2013.01); *G09C 1/00* (2013.01); *H04L 9/002* (2013.01); *H04L 2209/12* (2013.01)

(58) Field of Classification Search
CPC ......... G06F 21/50; G06F 21/55; G06F 21/57; G06F 21/577; G06F 21/70; G06F 21/71; G06F 21/74
See application file for complete search history.

(56) References Cited

U.S. PATENT DOCUMENTS

2008/0122499 A1* 5/2008 Frew et al. .................... 327/143
2008/0218393 A1* 9/2008 Kuramochi et al. .......... 341/143

* cited by examiner

*Primary Examiner* — Edward Zee
(74) *Attorney, Agent, or Firm* — Faegre Baker Daniels LLP (57) ABSTRACT

A method and apparatus is provided for monitoring performance of an processor to detect tampering and place the processor in a safe operating state that prevents unauthorized access to contents of the processor. In one example, the method and apparatus compares a measured value of an operating parameter (i.e., a temperature, supply voltage or clock signal) to predefined limits to identify an out of limits measured value. If an out of limits measured value is detected during a normal operating mode, the processor enters a reset mode, and if an out of limits measured value is detected during power up or reset, the processor in retained a reset mode.

22 Claims, 6 Drawing Sheets

METHOD AND APPARATUS FOR MONITORING PERFORMANCE FOR SECURE CHIP OPERATION

RELATED APPLICATIONS

The present application is based on and claims priority to provisional application Ser. No. 61/825,470, entitled "METHOD AND APPARATUS FOR MONITORING PERFORMANCE FOR SECURE CHIP OPERATION," filed on May 20, 2013, the entire disclosure of which is hereby expressly incorporated herein by reference.

FIELD OF THE DISCLOSURE

The present disclosure generally relates to monitoring performance of a processor, and more particularly to detecting tampering and placing the processor in a safe operating state that prevents unauthorized access to contents of the processor.

BACKGROUND OF THE DISCLOSURE

The disclosure relates generally to a method and apparatus for monitoring temperature, voltage and clock inputs to prevent unauthorized access to chip contents.

Many complex processors such as those including systems on a chip ("SoC") and used in video game consoles, store digital media content that is copyrighted or other proprietary information that needs to be secure. Such data is typically stored and transmitted in an encrypted format. Unfortunately, hackers sometimes purchase consoles with the goal of identifying the encryption keys used to protect the contents of the chip. With the encryption keys identified, the hacker can decrypt the content and exploit it in a variety of ways.

One method hackers use to gain access to the encryption keys is to change the operating parameters of the chip to place it in an undesirable mode of operation. When in such an undesirable mode, the chip's standard security circuits may be non-functional, thereby permitting access to the encryption keys, and then the proprietary content. For example, if a chip is forced to operate under very high or very low ambient temperatures, the chip may operate in an undesirable mode. Similarly, if any of a variety of voltage inputs to the chip are increased or decreased beyond certain limits, the chip may operate in an undesirable mode. Finally, if the clock input to the chip is modified in period or low time, the chip may operate in an undesirable mode. If the malfunctions resulting from an undesirable operating mode are repeatable, it is possible stored media content or other information can be hacked.

Moreover, processors may be particularly vulnerable to such hacking during transitional modes of operation such as power up and reset. Some processors have a platform security processor ("PSP") or security functional block which is configured to place the processor into a secure operating mode when a hacking attempt is detected, but this is often not sufficient as such security processor is limited to this secure operating mode and not during such transitional modes.

Accordingly, there exists a need for an improved method and apparatus for monitoring temperature, voltage and clock inputs to place the chip in a safe operating state that prevents unauthorized access to the contents of the chip and thereby address one or more of the above-noted drawbacks.

SUMMARY OF EMBODIMENTS OF THE INVENTION

According to one embodiment of the present disclosure, a method of monitoring performance of a processor to detect tampering and place the processor in a safe operating state that prevents unauthorized access to contents of the processor comprises, during a normal operating mode and at least one of a power up and a reset mode, comparing a measured value of an operating parameter to a predefined set of high and low limits for the measured value to identify an out of limits measured value. If an out of limits measured value is detected during the normal operating mode, the method further causes the processor to enter a reset mode, and if an out of limits measured value is detected during the at least one of a power up and a reset mode, the method retains the processor in a reset mode. In one aspect of this embodiment, the measured value is compared to a set of coarse high and low limits during the at least one of a power up and a reset mode, and is compared to a set of calibrated high and low limits during the normal operating mode. In another aspect of this embodiment, comparing a measured value comprises providing a plurality of minimum and maximum input signals from a digital circuit to an analog circuit, the plurality of minimum and maximum input signals corresponding to the predefined set of high and low limits, and receiving at the digital circuit a plurality of minimum and maximum output signals from the analog circuit, the plurality of minimum and maximum output signals corresponding to results of comparisons of the operating parameter to values determined by the minimum and maximum input signals. In yet another aspect of this embodiment, the operating parameter is one of a temperature, a supply voltage, and a clock signal.

In another aspect of this embodiment, the operating parameter is an operating temperature of the processor, and comparing a measured value comprises generating a first voltage across a first resistor being proportional to the operating temperature, generating a second voltage across a second resistor being proportional to the operating temperature, generating a temperature-independent first reference voltage as a function of a minimum limit input value, generating a temperature-independent second reference voltage as a function of a maximum limit input value, comparing the first voltage to the first reference voltage to determine if the first voltage is below the low limit, and comparing the second voltage to the second reference voltage to determine if the second voltage is above the high limit. In a variation of this aspect, during power up and during reset mode, the maximum limit input value corresponds to a predefined coarse high limit and the minimum limit input value corresponds to a predefined coarse low limit, and during the normal operating mode, the maximum limit input value corresponds to a predefined calibrated high limit and the minimum limit input value corresponds to a predefined calibrated low limit.

In yet another aspect of this embodiment, the operating parameter is one of a plurality of supply voltages to the processor, and comparing a measured value comprises dividing the one supply voltage in a first divider circuit that is a function of a maximum limit input value to produce a first voltage, dividing the one supply voltage in a second divider circuit that is a function of a minimum limit input value to produce a second voltage, generating a temperature-independent reference voltage, comparing the first voltage to the reference voltage to determine if the first voltage is above the high limit, and comparing the second voltage to the reference voltage to determine if the second voltage is below the low limit. In a variation of this aspect, the one supply voltage is identified as presenting a tampering security risk, the maximum limit input value corresponds to a predefined coarse high limit and the minimum limit input value corresponds to a predefined coarse low limit, and when the one supply voltage is identified as not presenting a tampering security risk, the maximum limit input value corresponds to a predefined calibrated high limit and the minimum limit input value corresponds to a predefined calibrated low limit.

In yet another aspect of this embodiment, the operating parameter is a reference clock signal, and comparing a measured value comprises counting oscillations of a ring oscillator between rising edges of the reference clock signal to produce a period signal, counting oscillations of the ring oscillator between sequential rising and falling edges of the reference clock signal to produce a low time signal, comparing the period signal to predefined high and low limits to determine if the period signal is out of limits, and comparing the low time signal to predefined high and low limits to determine if the low time signal is out of limits. In a variation of this aspect, during power up and during reset mode, the predefined high and low limits are coarse limits, and during the normal operating mode, the predefined high and low limits are calibrated limits. In another variation of this aspect, comparing a measured value comprises counting oscillations of the ring oscillator after a rising edge of the reference clock signal and generating an overflow signal indicating that the reference clock has stopped if the counted oscillations exceeds a predefined limit.

Another embodiment of the present disclosure provides an apparatus for monitoring performance of a processor to detect tampering and place the processor in a safe operating state that prevents unauthorized access to contents of the processor, comprising a digital circuit, a platform security processor coupled to the digital circuit, and a thermal analog circuit coupled to the digital circuit and configured to measure an operating temperature of the processor. In this embodiment, the thermal analog circuit includes a proportional-to-absolute temperature block that generates a first voltage across a first resistor being proportional to the operating temperature and a second voltage across a second resistor being proportional to the operating temperature, a first reference divider network that divides a temperature-independent voltage to a first reference voltage as a function of a maximum limit input value from the digital circuit, a second reference divider network that divides the temperature-independent voltage to a second reference voltage as a function of a minimum limit input value from the digital circuit, a first comparator that compares the first voltage to the first reference voltage and provides a first output to the digital circuit indicating whether the first voltage is above the first reference voltage, and a second comparator that compares the second voltage to the second reference voltage and provides a second output to the digital circuit indicating whether the second voltage is above the second reference voltage. According to this embodiment, the digital circuit provides an output signal to the platform security processor indicating a status of the operating temperature based on the first output and the second output, and the platform security processor determines whether to permit normal operation of the processor based on the digital circuit output signal. In one aspect of this embodiment, during a power up and during reset mode of the processor, the maximum limit input value from the digital circuit corresponds to a predefined coarse high limit for the operating temperature and the minimum limit input value from the digital circuit corresponds to a predefined coarse low limit for the operating temperature, and during a normal operating mode, the maximum limit input value corresponds to a predefined calibrated high limit and the minimum limit input value corresponds to a predefined calibrated low limit. In another aspect of this embodiment, the thermal analog circuit further comprises a bandgap block that generates the temperature-independent voltage.

Another embodiment of the present disclosure provides an apparatus for monitoring performance of a processor to detect tampering and place the processor in a safe operating state that prevents unauthorized access to contents of the processor comprising a digital circuit, a platform security processor coupled to the digital circuit, and a voltage analog circuit coupled to the digital circuit and configured to measure a selected one of a plurality of supply voltages to the processor, the voltage analog circuit. The voltage analog circuit includes a plurality of supply voltage inputs each configured to receive a different selected supply voltage, a first divider circuit configured to divide the selected supply voltage as a function of a maximum limit input value from the digital circuit to produce a first voltage, a second divider circuit configured to divide the selected supply voltage as a function of a minimum limit input value from the digital circuit to produce a second voltage, a bandgap block that generates a temperature-independent reference voltage across a reference resistor, a first comparator that compares the first voltage to the reference voltage and provides a first output to the digital circuit indicating whether the first voltage is above a high limit, and a second comparator that compares the second voltage to the reference voltage and provides a second output to the digital circuit indicating whether the second voltage is below a low limit. In this embodiment, the digital circuit provides an output signal to the platform security processor indicating a status of the selected supply voltage based on the first output and the second output, and the platform security processor determines whether to permit normal operation of the processor based on the digital circuit output signal. In another aspect of this embodiment, the apparatus further comprises a third divider circuit configured to divide the selected supply voltage as a function of a second maximum limit input value from the digital circuit to produce a third voltage, a fourth divider circuit configured to divide the selected supply voltage as a function of a second minimum limit input value from the digital circuit to produce a fourth voltage, a third comparator that compares the third voltage to the reference voltage and provides a third output to the digital circuit indicating whether the third voltage is above a second high limit, and a fourth comparator that compares the fourth voltage to the reference voltage and provides a fourth output to the digital circuit indicating whether the fourth voltage is below a second low limit. According to this aspect, when the selected supply voltage is identified as presenting a tampering security risk, the digital circuit provides the output signal to the platform security processor indicating the status of the selected supply voltage based on the first output and the second output, and when the selected supply voltage is identified as not presenting a tampering security risk, the digital circuit provides a second output signal to the platform security processor indicating a status of the selected supply voltage based on the third output and the fourth output, and the platform security processor determines whether to permit normal operation of the processor based on one of the digital circuit output signal and the digital circuit second output signal. According to a variant of this aspect of the embodiment, the maximum limit input value corresponds to a predefined coarse high limit, the minimum limit input value corresponds to a predefined coarse low limit, the second maximum limit input value corresponds to a predefined calibrated high limit and the second minimum limit input value corresponds to a predefined calibrated low limit.

According to still another embodiment of the present disclosure, an apparatus is provided for monitoring performance of a processor to detect tampering with a reference clock signal and place the processor in a safe operating state that prevents unauthorized access to contents of the processor comprising a digital circuit, a platform security processor coupled to the digital circuit, a period detector coupled to the digital circuit and including a ring oscillator, and a low time detector coupled to the digital circuit and including a ring oscillator. According to this embodiment, the period detector count a number of oscillations of the ring oscillator of the period detector that occur between successive rising edges of the reference clock signal and provides a period signal to the digital circuit, and the low time detector counts a number of oscillations of the ring oscillator of the low time detector that occur between a rising edge of the reference clock signal and a successive falling edge of the reference clock signal and provides a low time signal to the digital circuit, and the digital circuit compares the period signal to predefined high and low limits to determine if the period signal is out of limits, compares the low time signal to predefined high and low limits to determine if the low time signal is out of limits, and provides a frequency signal to the platform security processor indicating a status of the reference clock signal based on the comparisons of the period signal and the low time signal to the predefined high and low limits, the platform security processor determining whether to permit normal operation of the processor based on the status of the reference clock signal. In one aspect of this embodiment, during power up and during reset mode, the predefined high and low limits are coarse limits, and during a normal operating mode, the predefined high and low limits are calibrated limits. In another aspect of this embodiment, the period detector includes a counter configured to generate a most significant portion of the period signal and a capture state block configured to generate a least significant portion of the period signal. In yet another aspect of this embodiment, the low time detector includes a counter configured to generate a most significant portion of the low time signal and a capture state block configured to generate a least significant portion of the low time signal. In still another aspect of this embodiment, the period detector and the low time detector each include an overflow detection block configured to provide an overflow signal to the digital circuit indicating that the reference clock signal has stopped if the ring oscillation counts exceed a predefined limit.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Briefly, in one example, a method and apparatus for monitoring performance of a processor to detect tampering and place the processor in a safe operating state that prevents unauthorized access to contents of the processor includes, during a normal operating mode and at least one of a power up and a reset mode, comparing a measured value of an operating parameter to a predefined set of high and low limits for the measured value to identify an out of limits measured value, and if an out of limits measured value is detected during the normal operating mode, causing the processor to enter a reset mode, and if an out of limits measured value is detected during the at least one of a power up and a reset mode, retaining the processor in a reset mode. In certain embodiments, the operating parameter is one or a combination of an operating temperature of the processor, a supply voltage to the processor, or a clock signal provided to the processor. As such, the present disclosure provides a method and apparatus which inhibits tampering with such operating parameters of the processor to gain access to copyrighted or otherwise restricted information included within the processor by ensuring that the processor remains or is placed in a safe operating mode where such information is not available. Other advantages will be recognized by those skilled in the art.

Figure 1:
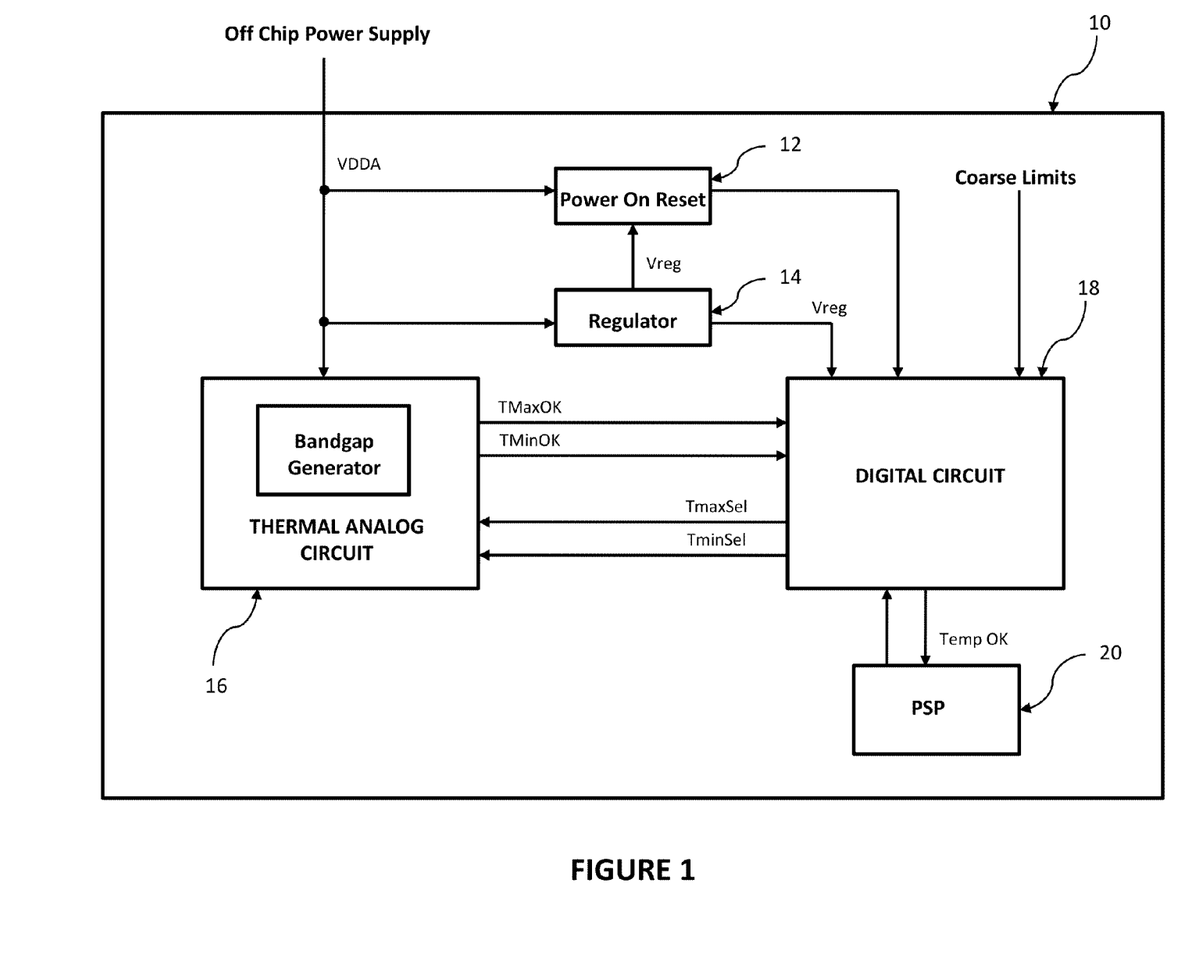
FIG. 1 is a block diagram illustrating one example of a chip configured for detecting and responding to thermal tampering.

FIG. 1 is a block diagram illustrating an exemplary processor—SoC 10—configured for detecting and responding to thermal tampering. Other types of integrated circuits and processors could also embody aspects of the invention including digital signal processors (DSPs), graphic processing units (GPUs), central processing units (CPUs), accelerated processing units (APUs), field programmable gate arrays (FPGAs) and the like. However, in the exemplary embodiments described herein the exemplary processor is illustrated and embodied in an SoC, SoC 10. SoC 10 generally includes a power on reset ("POR") circuit 12, a voltage regulator 14, a thermal analog circuit 16, a digital circuit 18 and a platform security processor ("PSP") 20. In general, when power is applied to SoC 10 by an off-chip power supply, voltage VDDA increases until it reaches an acceptable level. During this time, POR circuit 12 applies a reset signal to digital circuit 18 to prevent it from attempting to operate. POR circuit 12 also monitors VDDA and the output of regulator 14 (Vreg), which is also applied to digital circuit 18, to determine when Vreg reaches a level for safe operation of digital circuit 18. When Vreg reaches a safe voltage, digital circuit 18 begins operation by, among other things, providing TmaxSel and TminSel inputs to thermal analog circuit 16. These inputs correspond to coarse limits which are input to digital circuit 18 in the manner more fully described below. Based on these inputs, and the operating temperature of SoC 10, thermal analog circuit 16 provides TMaxOK and TMinOK outputs to digital circuit 18, which provides a Temp OK output signal to PSP 20. PSP 20 determines whether the Temp OK signal is out of limits, and if so, may keep SoC 10 in a reset mode.

When SoC 10 completes a power up or reset sequence (i.e., POR circuit 12 removes the reset signal applied to digital circuit 18 and SoC 10 enters a normal operating mode), digital circuit 18 reads calibrated values for TmaxSel and TminSel from PSP 20, and provides them as inputs to thermal analog circuit 16. As is further described below, these calibrated limits are specific to thermal analog circuit 16, and provide tighter monitoring limits for the operating temperature of SoC 10. When in normal operating mode, thermal analog circuit 16 uses the calibrated limits to provide TMaxOK and TMinOK signals to digital circuit 18, which in turn provides corresponding Temp OK signals to PSP 20. If PSP 20 determines that a Temp OK signal is out of limits, PSP 20 may cause SoC 10 to execute a reset operation.

Figure 2:
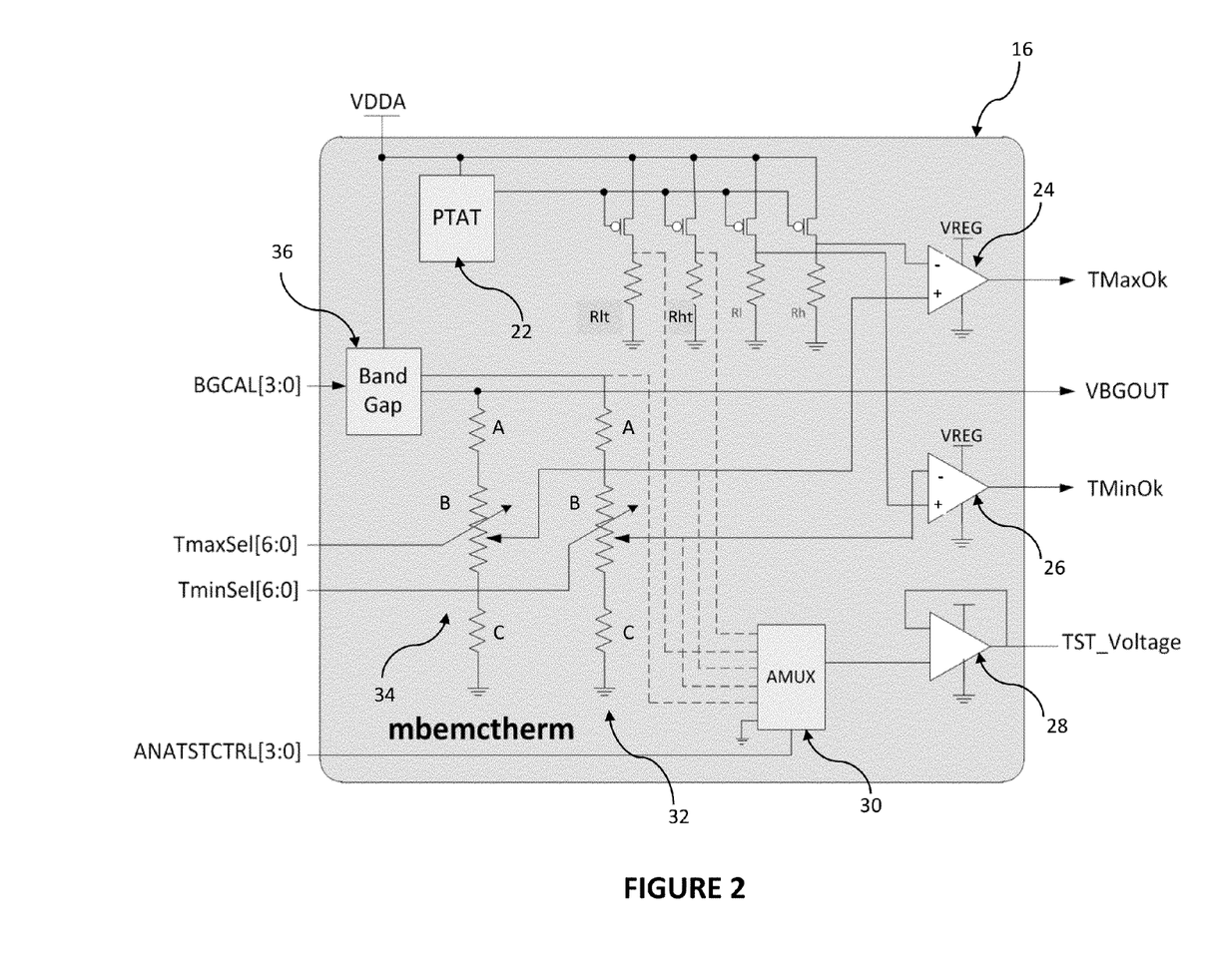
FIG. 2 is a block diagram illustrating one example of a thermal analog circuit for use on the chip of FIG. 1.

FIG. 2 is a more detailed block diagram illustrating one example of thermal analog circuit 16 of FIG. 1. As shown, thermal analog circuit 16 generally includes a proportional-to-absolute-temperature ("PTAT") block 22, a TMax comparator 24, a TMin comparator 26, a Test comparator 28, an analog multiplexer ("AMUX") 30, a Tmin divider circuit 32, a Tmax divider circuit 34, and a bandgap block 36. As indicated above, the basic function of thermal analog circuit 16 is to provide TMaxOK and TMinOK signals based on the TmaxSel and TminSel inputs and the temperature of circuit 16. To this end, PTAT block 22 evaluates a delta Vbe between two diodes which is linearly proportional to temperature. The output of PTAT block 22 causes voltages across resistors Rlt, Rht, Rl and Rh. The voltages across resistors Rlt and Rht are used for test purposes as is further described below. The voltage across Rl is provided as the positive input to Tmin comparator 26, and the voltage across Rh is provided as the negative input to TMax comparator 24. In one embodiment, the minimum temperature threshold check is governed by the equation, $\Delta V_{PTAT, min}$=0.155 uA/degree*14768 Ohm=2.289 mV/degree, and the maximum temperature threshold check is governed by the equation, $\Delta V_{PTAT, max}$=0.155 uA/degree*12186 Ohm=1.579 mV/degree.

Bandgap block 36 provides a constant VBGOUT signal which is a temperature-independent reference voltage for use in evaluating the sensed temperature of SoC 10. The VBGOUT signal is a function of the BGCAL input, which is derived during characterization of a batch of SoCs 10 and stored as hard connections (i.e., metal straps) on each SoC 10. VBGOUT is provided to Tmin divider circuit 32 and Tmax divider circuit 34. The outputs of Tmin divider circuit 32 and Tmax divider circuit 34 correspond to the temperature-independent VBGOUT signal divided down using the TminSel and TmaxSel inputs, respectively. As described above, TminSel and TmaxSel are provided as coarse limits initially, and then, during normal operation, as tighter, calibrated limits specific to thermal analog circuit 16. Regardless of the values of these inputs (i.e., coarse limits or calibrated limits), they vary the values of divider resistors 32B and 34B to provide output voltages representing the minimum and maximum temperature thresholds, outside of which PSP 20 may cause SoC 10 to execute a reset operation.

More specifically, TminSel varies resistor 32B of Tmin divider circuit 32, which produces a temperature-independent voltage at the negative input to TMin comparator 26. That input is compared to temperature-variable voltage across Rl, which is provided to the positive input of TMin comparator 26. The TMinOK signal provided from thermal analog circuit 16 to digital circuit 18 changes state to indicate whether the sensed minimum temperature (i.e., the temperature across Rl) exceeds the threshold of the temperature-independent value set by TminSel. Similarly, TmaxSel varies resistor 34B of Tmax divider circuit 34, which produces a temperature-independent voltage at the positive input to TMin comparator 26. That input is compared to temperature-variable voltage across Rh, which is provided to the negative input of TMax comparator 24. The TMaxOK signal provided from thermal analog circuit 16 to digital circuit 18 changes state to indicate whether the sensed maximum temperature (i.e., the temperature across Rh) exceeds the threshold of the temperature-independent value set by TmaxSel. Digital circuit 18 interprets the TmaxOK and TminOK signals, and provides a Temp OK signal to PSP 20 based thereon.

Two sets of limits (i.e., coarse and calibrated) are used for TminSel and TmaxSel as a result of variability in the fabrication process of SoC 10. The coarse limits are derived through simulation of thermal analog circuit 16 and adjustments are made during silicon testing. The limits are stored as hard connections (i.e., metal straps) internally on SoC 10, and when provided to thermal analog circuit 16 as TminSel and TmaxSel, provide relatively wide thresholds for comparison at Tmin comparator 26 and Tmax comparator 24, respectively, for use during power up and reset conditions. As should be apparent from the foregoing, these coarse limits, while less than optimal in terms of accuracy, provide reasonable limits during these transient conditions where calibrated limits are not available because digital circuit 18 is not fully operational. The calibrated limits for TminSel and TmaxSel are computed during production testing for each SoC 10, and when applied to thermal analog circuit 16, provide accurate temperature threshold limits that are specific to the particular SoC 10. In one embodiment, these limits are derived by applying a known temperature to SoC 10, and enabling internal self test operations that vary the values for TminSel and TmaxSel until the outputs of TMax comparator 24 and TMin comparator 26 change state. The tests are performed both at high temperature and at low temperature. The test equipment reads the values corresponding to the transitions of comparators 24, 26 under each temperature condition, and determines the calibration values of TminSel and TmaxSel which are programmed into the fuses of PSP 20.

Referring again to FIG. 2, AMUX 30 and Test comparator 28 are used to evaluate the internal voltages of thermal analog circuit 16 during silicon characterization and debug operations. Test equipment provides the ANATSTCTRL input signal, which in one embodiment is a four-bit signal, which selects the input signal to AMUX 30 for output to test comparator 28. As shown, the available inputs are the voltage across Rlt, the voltage across RHt, VBGOUT, the maximum temperature reference input to TMax comparator 24, and the minimum temperature reference input to TMin comparator 26.

By monitoring the actual temperature of SoC 10 not only during normal operation, but during power up and reset, SoC 10 can detect thermal tampering and prevent operation in non-normal operating modes, thereby reducing the likelihood that proprietary information may be accessed by unauthorized personnel.

Figure 3:
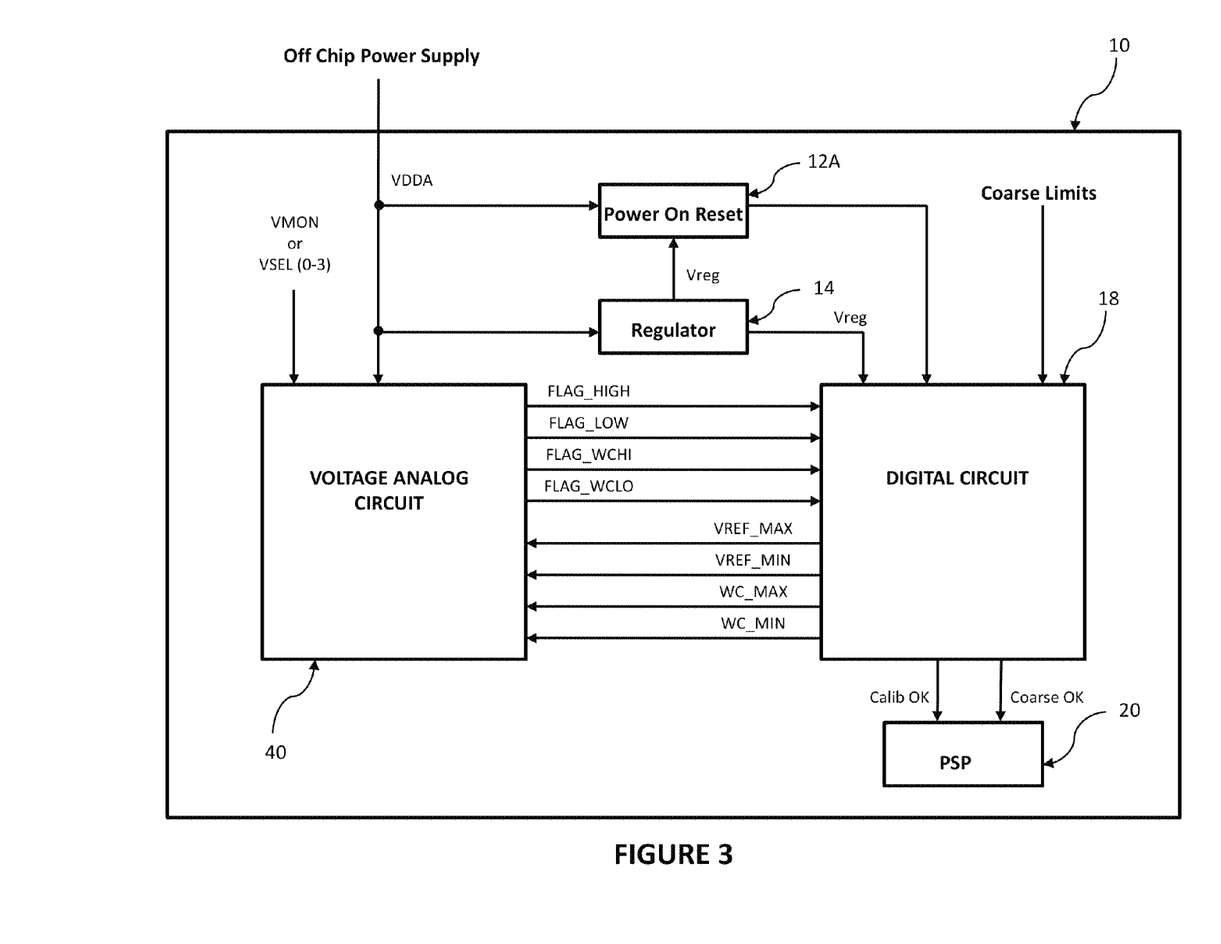
FIG. 3 is a block diagram illustrating one example of a chip configured for detecting and responding to voltage tampering.

Referring now to FIG. 3, a block diagram is shown illustrating an SoC 10 configured for detecting and responding to voltage tampering. As explained below, a variety of different supply voltages may be monitored with SoC 10, including memory voltage, I/O voltage, processor core voltage, and graphics processor voltage. In one embodiment, eleven different voltages are monitored through connection to one of the inputs to SoC 10.

The following description assumes that SoC 10 of FIG. 3 includes the same components as SoC 10 of FIG. 1, as well as additional components as described below. It should be understood, however, that SoC 10 may include temperature monitoring without voltage monitoring, voltage monitoring without temperature monitoring, or both temperature monitoring and voltage monitoring. SoC 10 generally includes a different instantiation of POR circuit 12 of FIG. 1 (i.e., POR 12A), voltage regulator 14, a voltage analog circuit 40, digital circuit 18 and PSP 20. As described above, when power is applied to SoC 10 by an off-chip power supply, voltage VDDA increases until it reaches an acceptable level. During this time, POR circuit 12A applies a reset signal to digital circuit 18 to prevent it from attempting to operate. POR circuit 12A also monitors VDDA and the output of regulator 14 (Vreg), which is also applied to digital circuit 18, to determine when Vreg reaches a level for safe operation of digital circuit 18. When Vreg reaches a safe voltage, digital circuit 18 begins operation and, among other things, provides VREF_MAX, VREF_MIN, WC_MAX and WC_MIN inputs to voltage analog circuit 40. These inputs correspond to coarse and calibrated voltage limits as more fully described below. Based on these inputs, voltage analog circuit 40 provides FLAG_HIGH, FLAG_LOW, FLAG_WCHI and FLAG_WCLO outputs to digital circuit 18, which provides a Coarse OK output signal and a Calib OK output signal to PSP 20. PSP 20 determines whether these signals are out of limits, and if so, may keep SoC 10 in a reset mode.

Depending upon the supply voltage being monitored, voltage analog circuit 40 uses the coarse limit inputs WC_MAX and WC_MIN from digital circuit 18 to set the thresholds against which the monitored voltage is compared. The values of WC_MAX and WC_MIN are set using metal straps, and are not programmable. The monitored voltages that use the coarse limits are determined to present security risks if tampering occurs, and are monitored in the manner described below during power up, reset and normal operation. Other monitored supply voltages which have been determined not to present security risks are monitored using the more accurate calibration limits VREF_MAX and VREF_MIN in the manner described below. The values of VREF_MAX and VREF_MIN are controlled using digital circuit 18 and can be programmed.

Figure 4:
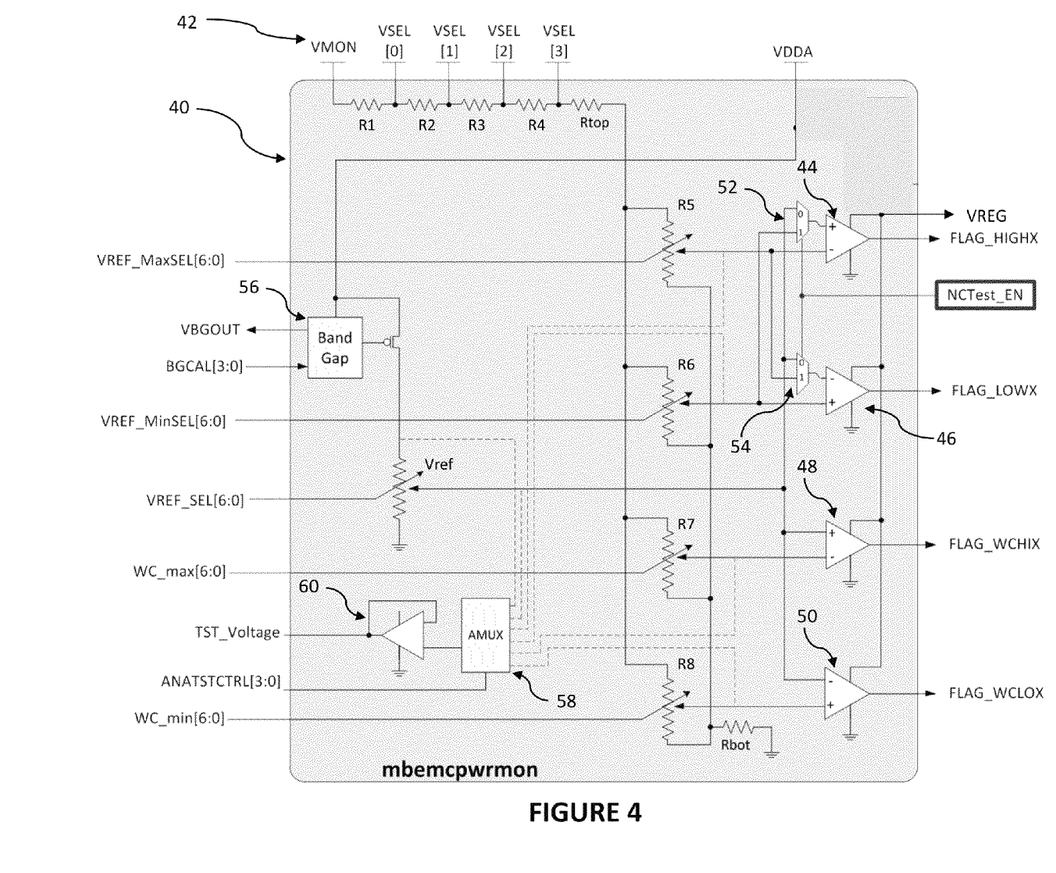
FIG. 4 is a block diagram illustrating one example of a voltage analog circuit for use on the chip of FIG. 3.

As shown in FIG. 4, voltage analog circuit 40 of FIG. 3 generally includes a plurality of monitored supply voltage input connections 42, input resistors R1-R4, resistor Rtop, comparators 44-50, variable resistors R5-R8, resistor Rbot, multiplexers 52, 54, bandgap block 56, analog multiplexer ("AMUX") 58, test voltage output amp 60, and variable reference resistor Vref. As indicated above, the basic function of voltage analog circuit 40 is to provide FLAG_HIGH, FLAG_LOW, FLAG_WCHI and FLAG_WCLO signals based on the VREF_MAX, VREF_MIN, WC_MAX and WC_MIN inputs and the value of the voltage being monitored. To this end, a monitored voltage is selected for connection to one of the plurality of inputs 42 of voltage analog circuit 40.

The input 42 selected for connection depends upon the nominal value of the voltage to be monitored. If the voltage has a low nominal value, it is connected to VSEL3 input 42 such that the divider networks consisting of Rtop, variable resistors R5-R8, and Rbot yield voltages in the desired range for comparators 44-50 to achieve a desired resolution. If, on the other hand, the voltage to be monitored has a high nominal value (e.g., up to 3.9 volts), it is connected to Vmon input 42 such that the divider networks consisting of R1-R4, Rtop, variable resistors R5-R8, and Rbot yield voltages in the desired range for comparators 44-50. Other monitored voltages having nominal values between the low and high values discussed above are connected to one of the other inputs 42. In one embodiment, the resistor values are selected such that the voltage at the junction between Rtop and resistors R5-R8 cannot exceed 0.9 volts, which is the lowest acceptable value of the logic supply voltage Vreg. In an exemplary embodiment, the resistor values for R1-R5, Rtop and Rbot are selected to prevent the voltage at this junction from exceeding 0.9 volts based on the following assumed maximum values for monitored voltages at inputs 42: Vmon=3.9 volts; VSEL0=2.2 volts; VSEL1=1.8 volts; VSEL2=1.5 volts; and VSEL3=1.3 volts. As shown, regardless of the input connection 42 used, monitored voltages are generated across resistors R5-R8 which depend on the values of VREF_MAX, VREF_MIN, WC_MAX and WC_MIN inputs.

Bandgap block 56 provides a temperature-independent output voltage to resistor Vref. The voltage at the output of resistor Vref depends on the value of VREF_SEL, and represents the temperature independent reference voltage supplied to the negative input of comparator 50, the positive input of comparator 48, and the 0 input to multiplexers 52, 54. The output of resistor R5 is supplied to the negative input of comparator 44 and the 1 input of multiplexer 54. The output of multiplexer 54 is supplied to the negative input of comparator 46. Similarly, the output of resistor R6 is supplied to the positive input of comparator 46 and the 1 input of multiplexer 52. The output of multiplexer 52 is supplied to the positive input of comparator 44. As described below, the outputs of resistors R5 and R6 are provided to multiplexers 52, 54 for testing purposes.

In operation, digital circuit 18 provides inputs VREF_MAX, VREF_MIN, WC_MAX and WC_MIN to voltage analog circuit 40. Inputs WC_MAX and WC_MIN vary resistors R7 and R8, respectively, to generate the uncalibrated or coarse "wide check" values of the monitored voltage for comparators 48, 50, respectively (the "widecheck thresholds"). The output of comparator 48 (FLAG_WCHI) transitions if the divided down monitored voltage at the output of resistor R7 exceeds the voltage at the output of resistor Vref. Similarly, the output of comparator 50 (FLAG_WCLO) transitions if the divided down monitored voltage at the output of resistor R8 falls below the voltage at the output of resistor Vref. In one embodiment of the present disclosure, the widecheck thresholds are continuously monitored for certain supply voltages.

Inputs VREF_MAX and VREF_MIN vary resistors R5 and R6, respectively, to generate the calibrated values of the monitored voltage for comparators 48, 50, respectively. The output of comparator 44 (FLAG_HIGH) transitions if the divided down monitored voltage at the output of resistor R5 exceeds the voltage at the output of resistor Vref. Similarly, the output of comparator 46 (FLAG_LOW) transitions if the divided down monitored voltage at the output of resistor R6 falls below the voltage at the output of resistor Vref. Thus, depending upon the supply voltage to be monitored, digital circuit 18 monitors the outputs (FLAG_HIGH and FLAG_LOW for monitored voltages that do not present a security risk, and FLAG_WCHI and FLAG_WCLO for monitored voltages that do present a security risk) from voltage analog circuit 40, and provides a Coarse OK signal (based on the FLAG_WCHI and FLAG_WCLO outputs) and a Calib OK signal (based on the FLAG_HIGH and FLAG_LOW outputs) to PSP 20. PSP 20 determines whether these signals are out of limits, and if so, may keep SoC 10 in a reset mode or place SoC 10 in a reset mode to prevent unauthorized access to proprietary information.

Referring again to FIG. 4, AMUX 58 and output amp 60 are used to evaluate the internal voltages of voltage analog circuit 40 during silicon characterization and debug operations. Test equipment provides the ANATSTCTRL input signal, which in one embodiment is a four-bit signal, which selects the input signal to AMUX 58 for output to output amp 60. As shown, the available inputs are the voltages at the outputs of resistors R5-R8, the voltage at the output of resistor Vref, and the output voltage of bandgap block 56. Also, using the NCTest_EN input, a user can set maximum and minimum voltage limits at the positive input to comparator 44 and the negative input to comparator 46 to determine whether the trip points for the comparators 44, 46 are as expected based on the design of the circuit. In this manner, the user can test for random defects without having to employ normal test procedures.

Figure 5:
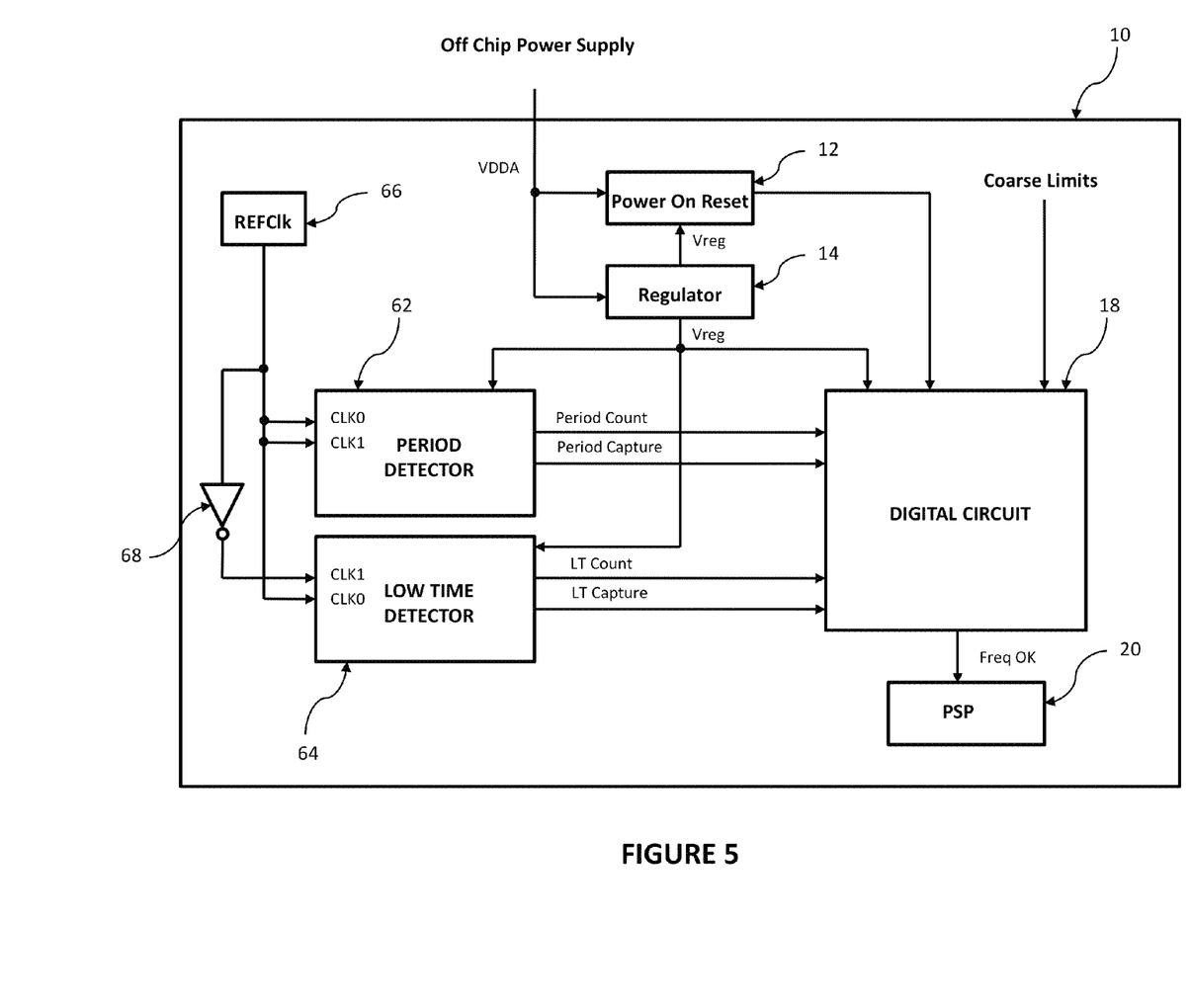
FIG. 5 a block diagram illustrating one example of a chip configured for detecting and responding to clock input tampering.

Referring now to FIG. 5, a block diagram is shown illustrating an SoC 10 configured for detecting and responding to tampering with the reference clock signal of SoC 10 in an attempt to produce a non-standard operating state wherein proprietary information stored in SoC 10 may be accessed. The following description assumes that SoC 10 of FIG. 5 includes the same components as SoC 10 of FIG. 3, as well as additional components as described below. It should be understood, however, that SoC 10 may include any combination of temperature monitoring, voltage monitoring and clock monitoring within the teachings of the present disclosure. SoC 10 generally includes POR circuit 12, voltage regulator 14, a period detector 62, a low time detector 64, digital circuit 18, a reference clock ("REFClk") 66, an inverter 68 and PSP 20.

As described above, when power is applied to SoC 10 by an off-chip power supply, voltage VDDA increases until it reaches an acceptable level. During this time, POR circuit 12 applies a reset signal to digital circuit 18 to prevent it from attempting to operate. POR circuit 12 also monitors VDDA and the output of regulator 14 (Vreg), which is also applied to digital circuit 18, period detector 62 and low time detector 64, to determine when Vreg reaches a level for safe operation of these components. When Vreg reaches a safe voltage, digital circuit 18 begins operation and, among other things, begins using metal strap coarse limits to evaluate the outputs of period detector 62 and low time counter 64 to detect tampering with REFClk 66 in the manner described below. Based on the outputs of period detector 62 and low time counter 64, digital circuit 18 provides a Freq OK output signal to PSP 20. From that, PSP 20 determines whether the period or low time of REFClk is out of limits, and if so, may keep SoC 10 in a reset mode or place SoC 10 in a reset mode to prevent unauthorized access to proprietary information.

As shown in FIG. 5, period detector 62 receives as inputs CLK0 and CLK1 the output of REFClk 66. Low time detector 64, on the other hand, receives the output of REFClk 66 as input CLK0 and the inverse of the output of REFClk 66 as input CLK1. Based on these inputs, period detector 62 provides a period count output and a period capture output to digital circuit 18. Similarly, low time detector 64 provides a LT count and an LT capture output to digital circuit 18.

Figure 6:
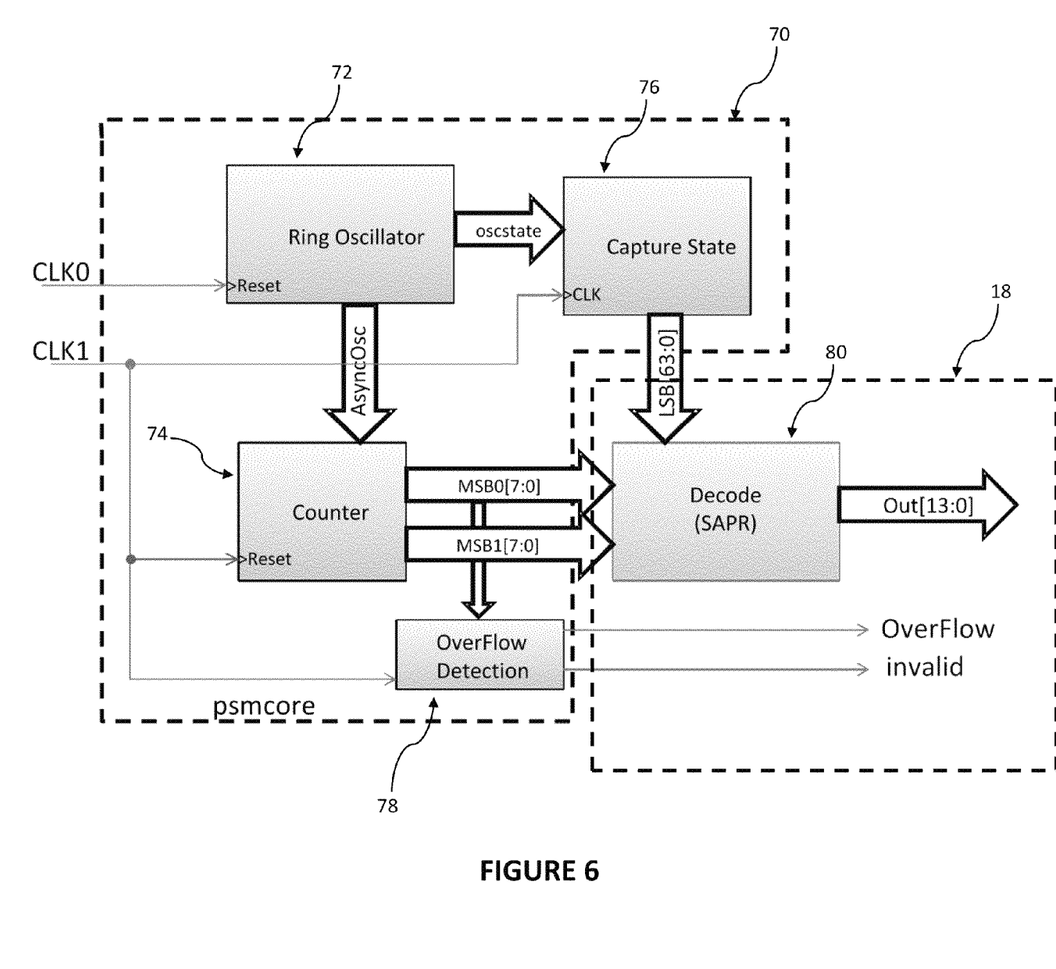
FIG. 6 is a block diagram illustrating one example of a period and/or low time detector for use on the chip of FIG. 5.

Referring now to FIG. 6, each of period detector 62 and low time detector 64 includes functionality designated by the numeral 70 and referred to hereinafter as "clock circuit" 70. Clock circuit 70 includes a ring oscillator 72, a counter 74, a capture state block 76 and an overflow detection block 78. Ring oscillator 70 includes a series of components connected in a feedback configuration that oscillates (when power is applied) at a frequency based on temperature and process voltage. In one embodiment of the disclosure, ring oscillator 72 is a 16-stage ring oscillator that operates in a pseudo free-running mode with a nominal frequency of 3.2 GHz. Ring oscillator 70 beings operation on the rising edge of CLK0. In one embodiment of the disclosure, the frequency of CLK0 is on the order of hundreds of megahertz, while the oscillation frequency of ring oscillator is 10 to 20 times faster. When CLK0 goes high, CLK1 (as supplied to period detector 62) also goes high, and counter 74 begins counting the number of oscillations (i.e., rising edges) of ring oscillator 70. At the next rising edge of CLK1, the internal state of ring oscillator 72 is captured by capture state block 76 and counter 74. Counter 74 provides a period count output representing the most significant bits of the number of oscillations, and capture state block 76 provides a period capture output representing the least significant bits of the number of oscillations, to decode block 80 which is part of digital circuit 18 of FIG. 5. Decode block compresses the 16 bit period count output from counter 74 and the 64 bit period capture output from capture state block 76 into a 14 bit output signal that is compared, during power up and reset conditions, to metal strap coarse limits provided to digital circuit 18 as shown in FIG. 5. The outputs are compared to calibrated limits (programmed in fuses of PSP 20) during normal operating conditions of digital circuit 18. Further details regarding period detector 62 are included in U.S. Published Application No. 2012/0126847, entitled "POWER SUPPLY MONITOR," the disclosure of which is expressly incorporated herein by reference.

The period count output is also monitored by overflow detection block 78, which determines when ring oscillator 72 oscillates a number of times between rising edges of CLK1 that exceeds the bits of counter 74. This indicates that REFClk 66 was stopped. This information is provided to digital circuit 18 as an overflow signal.

As indicated above, low time detector 64 includes the same clock circuit 70 functionality as described above for period detector 62. As shown in FIG. 5, however, the CLK1 input to low time detector 64 is inverted relative to the CLK1 input to period detector 62. Accordingly, low time detector 64 operates as described above with reference to period detector 62, but provides LT count output and LT capture output which together represent the number of oscillations of ring oscillator 72 between each rising edge of REFClk 66 and the subsequent falling edge of REFClk 66. Both the period and the low time of REFClk 66 are monitored in the above-described manner because it is possible for a hacker to insert a REFClk 66 signal that operates at an acceptable frequency (i.e., the period between rising edges is acceptable), but has an unacceptable high time which may cause improper operation of SoC 10 and unauthorized access to copyrighted or proprietary information.

The monitored value of the period and low time of REFClk 66 as compared to coarse limits during power up and reset conditions, and calibrated limits during normal operation, are provided to PSP 20 in the form of the Freq OK signal shown in FIG. 5. From that, PSP 20 determines whether the period or low time of REFClk 66 are out of limits, and if so, may keep SoC 10 in a reset mode or place SoC 10 in a reset mode to prevent unauthorized access to proprietary information.

In one embodiment of the disclosure, digital circuit 18 further includes filtering of the signals from period detector 62 and low time detector 64 which evaluates consecutive measurements from each to detect erroneous signals resulting from noise.

Among other advantages, for example, the method and apparatus provides the ability to detect and deter attempts to hack into the copyrighted and proprietary information in the SoC during power up and reset modes of operation. Other advantages will be apparent to those skilled in the art.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method of monitoring performance of a processor to detect tampering and place the processor in a safe operating state that prevents unauthorized access to contents of the processor, comprising:

during a normal operating mode and at least one of a power up and a reset mode, comparing a measured value of an operating parameter to a predefined set of high and low limits for the measured value to identify an out of limits measured value; and if an out of limits measured value is detected during the normal operating mode, causing the processor to enter a reset mode, and if an out of limits measured value is detected during the at least one of a power up and a reset mode, retaining the processor in a reset mode;

wherein comparing a measured value comprises providing a plurality of minimum and maximum input signals from a digital circuit to an analog circuit, the plurality of minimum and maximum input signals corresponding to the predefined set of high and low limits, and receiving at the digital circuit a plurality of minimum and maximum output signals from the analog circuit, the plurality of minimum and maximum output signals corresponding to results of comparisons of the operating parameter to values determined by the minimum and maximum input signals.

2. The method of claim 1, wherein the measured value is compared to a set of coarse high and low limits during the at least one of a power up and a reset mode, and is compared to a set of calibrated high and low limits during the normal operating mode.

3. The method of claim 1, wherein the operating parameter is one of a temperature, a supply voltage, and a clock signal.

4. A method of monitoring performance of a processor to detect tampering and place the processor in a safe operating state that prevents unauthorized access to contents of the processor, comprising:

during a normal operating mode and at least one of a power up and a reset mode, comparing a measured value of an operating temperature of the processor to a predefined set of high and low limits for the measured value to identify an out of limits measured value; and if an out of limits measured value is detected during the normal operating mode, causing the processor to enter a reset mode, and if an out of limits measured value is detected during the at least one of a power up and a reset mode, retaining the processor in a reset mode;

wherein comparing a measured value comprises generating a first voltage across a first resistor being proportional to the operating temperature, generating a second voltage across a second resistor being proportional to the operating temperature, generating a temperature-independent first reference voltage as a function of a minimum limit input value, generating a temperature-independent second reference voltage as a function of a maximum limit input value, comparing the first voltage to the first reference voltage to determine if the first voltage is below the low limit, and comparing the second voltage to the second reference voltage to determine if the second voltage is above the high limit.

5. The method of claim 4, wherein during power up and during reset mode, the maximum limit input value corresponds to a predefined coarse high limit and the minimum limit input value corresponds to a predefined coarse low limit, and during the normal operating mode, the maximum limit input value corresponds to a predefined calibrated high limit and the minimum limit input value corresponds to a predefined calibrated low limit.

6. A method of monitoring performance of a processor to detect tampering and place the processor in a safe operating state that prevents unauthorized access to contents of the processor, comprising:

during a normal operating mode and at least one of a power up and a reset mode, comparing a measured value of one of a plurality of supply voltages to the processor to a predefined set of high and low limits for the measured value to identify an out of limits measured value; and if an out of limits measured value is detected during the normal operating mode, causing the processor to enter a reset mode, and if an out of limits measured value is detected during the at least one of a power up and a reset mode, retaining the processor in a reset mode;

wherein comparing a measured value comprises dividing the one supply voltage in a first divider circuit that is a function of a maximum limit input value to produce a first voltage, dividing the one supply voltage in a second divider circuit that is a function of a minimum limit input value to produce a second voltage, generating a temperature-independent reference voltage, comparing the first voltage to the reference voltage to determine if the first voltage is above the high limit, and comparing the second voltage to the reference voltage to determine if the second voltage is below the low limit.

7. The method of claim 6, wherein when the one supply voltage is identified as presenting a tampering security risk, the maximum limit input value corresponds to a predefined coarse high limit and the minimum limit input value corresponds to a predefined coarse low limit, and when the one supply voltage is identified as not presenting a tampering security risk, the maximum limit input value corresponds to a predefined calibrated high limit and the minimum limit input value corresponds to a predefined calibrated low limit.

8. A method of monitoring performance of a processor to detect tampering and place the processor in a safe operating state that prevents unauthorized access to contents of the processor, comprising:

during a normal operating mode and at least one of a power up and a reset mode, comparing a measured value of a reference clock signal to a predefined set of high and low limits for the measured value to identify an out of limits measured value; and if an out of limits measured value is detected during the normal operating mode, causing the processor to enter a reset mode, and if an out of limits measured value is detected during the at least one of a power up and a reset mode, retaining the processor in a reset mode;

wherein comparing a measured value comprises counting oscillations of a ring oscillator between rising edges of the reference clock signal to produce a period signal, counting oscillations of the ring oscillator between sequential rising and falling edges of the reference clock signal to produce a low time signal, comparing the period signal to predefined high and low limits to determine if the period signal is out of limits, and comparing the low time signal to predefined high and low limits to determine if the low time signal is out of limits.

9. The method of claim 8, wherein during power up and during reset mode, the predefined high and low limits are coarse limits, and during the normal operating mode, the predefined high and low limits are calibrated limits.

10. The method of claim 8, wherein comparing a measured value comprises counting oscillations of the ring oscillator after a rising edge of the reference clock signal and generating an overflow signal indicating that the reference clock has stopped if the counted oscillations exceeds a predefined limit.

11. An apparatus for monitoring performance of a processor to detect tampering and place the processor in a safe operating state that prevents unauthorized access to contents of the processor, comprising:

a circuit that compares, during a normal operating mode and at least one of a power up and a reset mode, a first measured value being proportional to an operating temperature of the processor to a predefined set of high and low limits for the measured value to identify an out of limits measured value;

wherein if an out of limits measured value is detected during the normal operating mode, the circuit causes the processor to enter a reset mode, and if an out of limits measured value is detected during the at least one of a power up and a reset mode, the circuit retains the processor in a reset mode; and wherein the circuit compares the first measured value by providing a plurality of minimum and maximum input signals from a digital circuit to an analog circuit, the plurality of minimum and maximum input signals corresponding to the predefined set of high and low limits, and by receiving at the digital circuit a plurality of minimum and maximum output signals from the analog circuit, the plurality of minimum and maximum output signals corresponding to results of comparisons of the first measured value to values determined by the minimum and maximum input signals.

12. An apparatus for monitoring performance of an integrated circuit (IC) to detect tampering and place the IC in a safe operating state that prevents unauthorized access to contents of the IC, comprising:
a digital circuit;
a platform security processor coupled to the digital circuit; and
a thermal analog circuit coupled to the digital circuit and configured to measure an operating temperature of the IC, the thermal analog circuit including
a proportional-to-absolute temperature block that generates a first voltage across a first resistor being proportional to the operating temperature and a second voltage across a second resistor being proportional to the operating temperature,
a first reference divider network that divides a temperature-independent voltage to a first reference voltage as a function of a maximum limit input value from the digital circuit,
a second reference divider network that divides the temperature-independent voltage to a second reference voltage as a function of a minimum limit input value from the digital circuit,
a first comparator that compares the first voltage to the first reference voltage and provides a first output to the digital circuit indicating whether the first voltage is above the first reference voltage, and
a second comparator that compares the second voltage to the second reference voltage and provides a second output to the digital circuit indicating whether the second voltage is above the second reference voltage;
wherein the digital circuit provides an output signal to the platform security processor indicating a status of the operating temperature based on the first output and the second output, and the platform security processor determines whether to permit normal operation of the IC based on the digital circuit output signal.

13. The apparatus of claim 12, wherein during a power up and during reset mode of the IC, the maximum limit input value from the digital circuit corresponds to a predefined coarse high limit for the operating temperature and the minimum limit input value from the digital circuit corresponds to a predefined coarse low limit for the operating temperature, and during a normal operating mode, the maximum limit input value corresponds to a predefined calibrated high limit and the minimum limit input value corresponds to a predefined calibrated low limit.

14. The apparatus of claim 12, the thermal analog circuit further comprising a bandgap block that generates the temperature-independent voltage.

15. An apparatus for monitoring performance of a processor to detect tampering and place the processor in a safe operating state that prevents unauthorized access to contents of the processor, comprising:
a digital circuit;
a platform security processor coupled to the digital circuit; and
a voltage analog circuit coupled to the digital circuit and configured to measure a selected one of a plurality of supply voltages to the processor, the voltage analog circuit including
a plurality of supply voltage inputs each configured to receive a different selected supply voltage,
a first divider circuit configured to divide the selected supply voltage as a function of a maximum limit input value from the digital circuit to produce a first voltage,
a second divider circuit configured to divide the selected supply voltage as a function of a minimum limit input value from the digital circuit to produce a second voltage,
a bandgap block that generates a temperature-independent reference voltage across a reference resistor,
a first comparator that compares the first voltage to the reference voltage and provides a first output to the digital circuit indicating whether the first voltage is above a high limit, and
a second comparator that compares the second voltage to the reference voltage and provides a second output to the digital circuit indicating whether the second voltage is below a low limit;
wherein the digital circuit provides an output signal to the platform security processor indicating a status of the selected supply voltage based on the first output and the second output, and the platform security processor determines whether to permit normal operation of the processor based on the digital circuit output signal.

16. The apparatus of claim 15, further comprising
a third divider circuit configured to divide the selected supply voltage as a function of a second maximum limit input value from the digital circuit to produce a third voltage,
a fourth divider circuit configured to divide the selected supply voltage as a function of a second minimum limit input value from the digital circuit to produce a fourth voltage,
a third comparator that compares the third voltage to the reference voltage and provides a third output to the digital circuit indicating whether the third voltage is above a second high limit, and
a fourth comparator that compares the fourth voltage to the reference voltage and provides a fourth output to the digital circuit indicating whether the fourth voltage is below a second low limit;
wherein when the selected supply voltage is identified as presenting a tampering security risk, the digital circuit provides the output signal to the platform security processor indicating the status of the selected supply voltage based on the first output and the second output, and when the selected supply voltage is identified as not presenting a tampering security risk, the digital circuit provides a second output signal to the platform security processor indicating a status of the selected supply voltage based on the third output and the fourth output, and the platform security processor determines whether to permit normal operation of the processor based on one of the digital circuit output signal and the digital circuit second output signal.

17. The apparatus of claim 16, wherein the maximum limit input value corresponds to a predefined coarse high limit, the minimum limit input value corresponds to a predefined coarse low limit, the second maximum limit input value corresponds to a predefined calibrated high limit and the second minimum limit input value corresponds to a predefined calibrated low limit.

18. An apparatus for monitoring performance of an processor to detect tampering with a reference clock signal and place the processor in a safe operating state that prevents unauthorized access to contents of the processor, comprising:

a digital circuit;
a platform security processor coupled to the digital circuit;
a period detector coupled to the digital circuit and including a ring oscillator; and
a low time detector coupled to the digital circuit and including a ring oscillator;
wherein the period detector count a number of oscillations of the ring oscillator of the period detector that occur between successive rising edges of the reference clock signal and provides a period signal to the digital circuit, and the low time detector counts a number of oscillations of the ring oscillator of the low time detector that occur between a rising edge of the reference clock signal and a successive falling edge of the reference clock signal and provides a low time signal to the digital circuit; and
wherein the digital circuit compares the period signal to predefined high and low limits to determine if the period signal is out of limits, compares the low time signal to predefined high and low limits to determine if the low time signal is out of limits, and provides a frequency signal to the platform security processor indicating a status of the reference clock signal based on the comparisons of the period signal and the low time signal to the predefined high and low limits, the platform security processor determining whether to permit normal operation of the processor based on the status of the reference clock signal.

19. The apparatus of claim 18, wherein during power up and during reset mode, the predefined high and low limits are coarse limits, and during a normal operating mode, the predefined high and low limits are calibrated limits.

20. The apparatus of claim 18, wherein the period detector includes a counter configured to generate a most significant portion of the period signal and a capture state block configured to generate a least significant portion of the period signal.

21. The apparatus of claim 18, wherein the low time detector includes a counter configured to generate a most significant portion of the low time signal and a capture state block configured to generate a least significant portion of the low time signal.

22. The apparatus of claim 18, wherein the period detector and the low time detector each include an overflow detection block configured to provide an overflow signal to the digital circuit indicating that the reference clock signal has stopped if the ring oscillation counts exceed a predefined limit.

* * * * *